2 Sheets—Sheet 1.

T. KUNDTZ.

SEWING MACHINE TABLE.

No. 11,453. Reissued Nov. 13, 1894.

Witnesses.
E. B. Gilchrist
Edwards

Inventor.
Theodor Kundtz.
By M. D. Leggett & Co.
his attorneys.

2 Sheets—Sheet 2.

T. KUNDTZ.

SEWING MACHINE TABLE.

No. 11,453. Reissued Nov. 13, 1894.

Witnesses.
E. B. Gilchrist
Crowell

Inventor.
Theodor Kundtz
By M. D. Leggett & Co.
his attorneys.

UNITED STATES PATENT OFFICE.

THEODOR KUNDTZ, OF CLEVELAND, OHIO.

SEWING-MACHINE TABLE.

SPECIFICATION forming part of Reissued Letters Patent No. 11,453, dated November 13, 1894.

Original No. 491,656, dated February 14, 1893. Application for reissue filed June 20, 1894. Serial No. 515,203.

*To all whom it may concern:*

Be it known that I, THEODOR KUNDTZ, of Cleveland, in the county of Cuyahoga and State of Ohio, have invented certain new and useful Improvements in Sewing-Machine Tables; and I do hereby declare the following to be a full, clear, and exact description of the invention, such as will enable others skilled in the art to which it pertains to make and use the same.

My invention relates to sewing-machine tables of the cabinet variety and having means for depressing the head of the machine below the line of the table, and having means for automatically shifting the head toward and from the line of the fly-wheel in raising and lowering the head.

Figure 1:
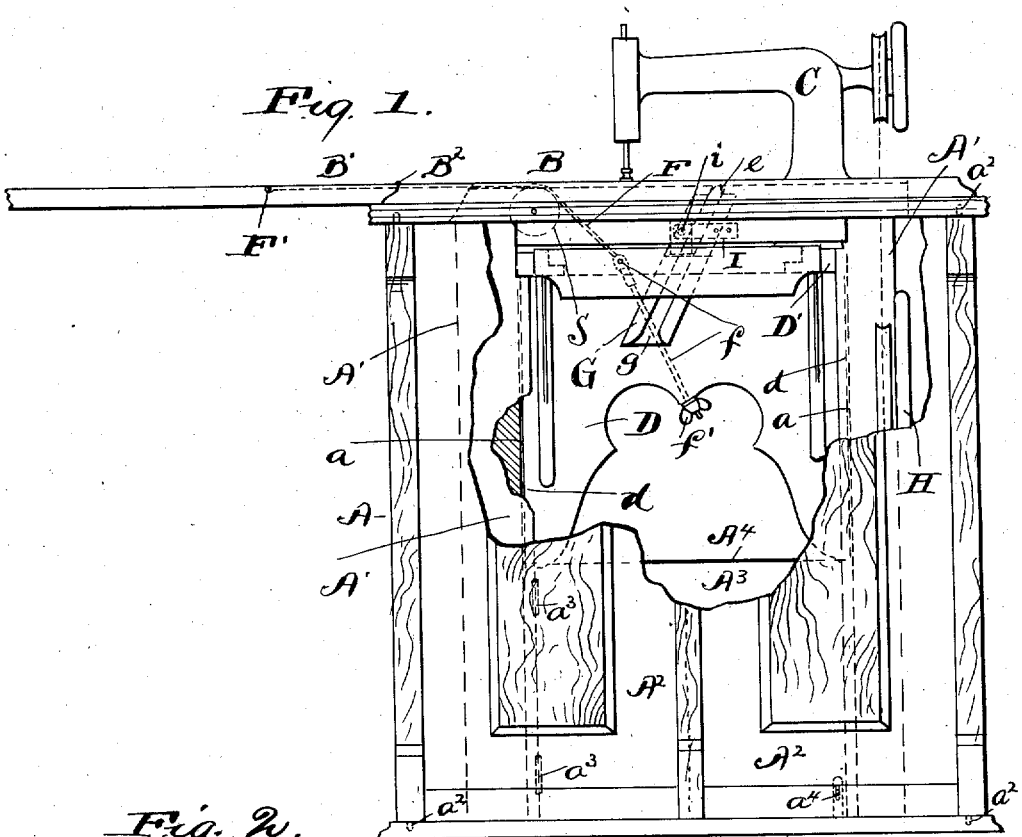
Figure 2:
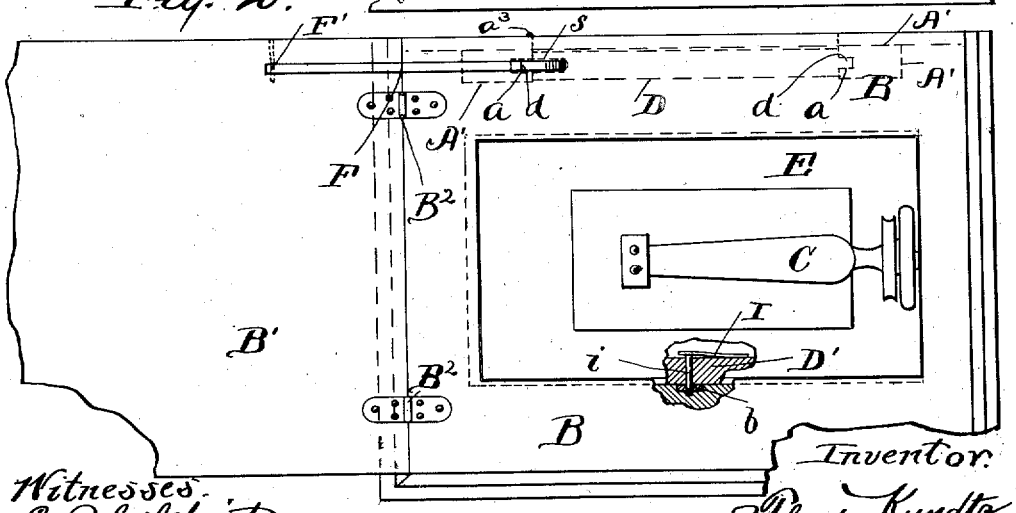
Figures 4, 5:
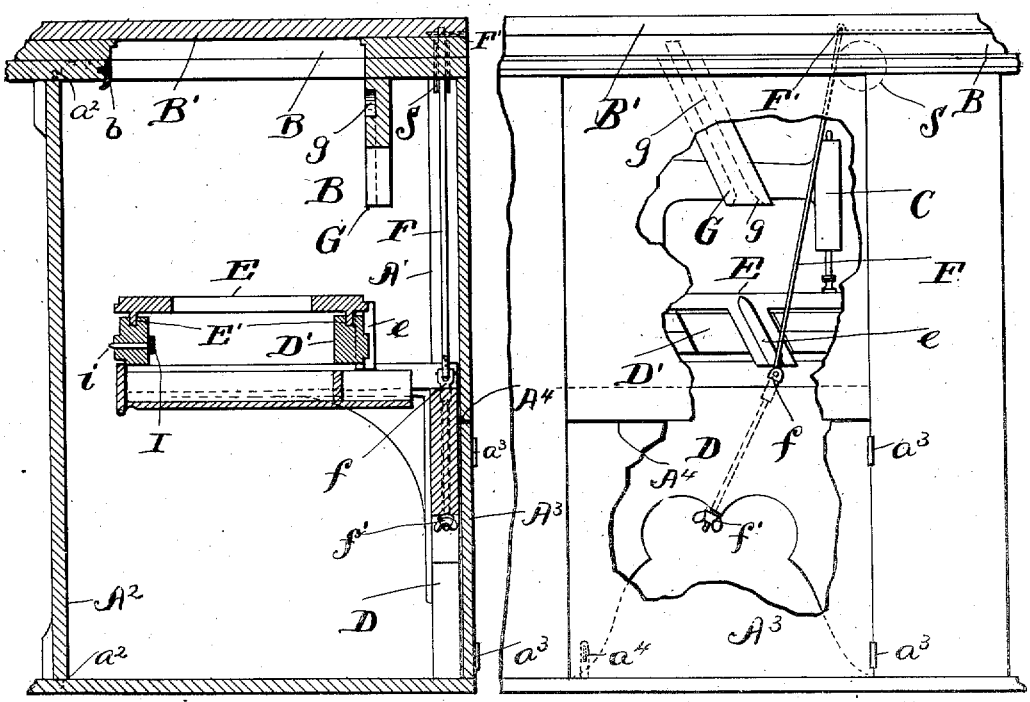
Figure 3:
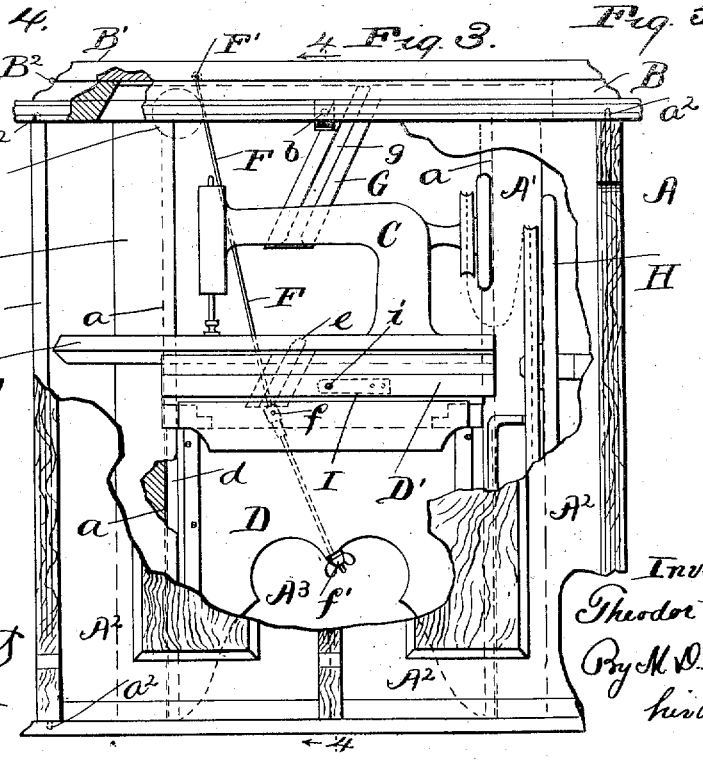

In the accompanying drawings, Figure 1 is a front side elevation of a sewing-machine-table or cabinet embodying my invention, the head of the machine being shown in position for operation. Fig. 2 is a top plan of the same, portions being broken away and in section to reduce the size of the figure and to more clearly show the construction. Fig. 3 is a front side elevation of the table or cabinet, showing the sewing-machine-head in its lowered position, portions being broken away and in section. Fig. 4 is an elevation in section on line 4—4, Fig. 3, with the sewing-machine-head removed. Fig. 5 is a rear side elevation of the table or cabinet, showing the sewing-machine-head in its lowered position, portions being broken away to more clearly show the construction.

A A represent the end walls of a sewing-machine-cabinet; B the table-top, and C the sewing-machine-head. Vertically-arranged bars A′ A′, located a suitable distance apart and secured to the rear wall of the cabinet, are grooved vertically on their inner faces, as at *a*, and in these grooves operate the ends *d* of carrier D. At the top, the carrier extends forward somewhat like a shelf, as at D′, and on this shelf is mounted a sliding-frame E, the frame and the shelf being tongued and grooved together, as at E′, Fig. 4, or otherwise joined so that the frame may slide endwise on the shelf without losing its lateral alignment. The head C is mounted on, and, rigidly secured to frame E.

B′ is a folding-leaf hinged to the table-top at $B^2$. To this leaf at or near the rear edge thereof and some little distance from the axial line or hinges, is secured, as at F′, the flexible member F, preferably a thin metal strap. This strap passes over a small roller or wheel S, connected with the table, and thence member F connects with the carrier, the attachment being preferably by means of an eye-bolt *f* furnished with a thumb-nut *f′*, by manipulating which the length of the strap may be adjusted so that when the leaf is extended, as shown in Figs. 1 and 2, the carrier will be drawn up with frame E in position flush with the table-top, the latter having a suitable central opening to receive the frame. From the under side and rear edge of the table depends the inclined block G having a groove *g* in the front face thereof. Connected with the rear edge of frame E is an inclined tongue or member *e* adapted to operate in groove *g* aforesaid. As the carrier is being elevated member *e* enters groove *g* whereby a further upward movement of the carrier causes the frame to be moved endwise in the direction of the fly-wheel H, the relation of parts being such that, when the head is in its elevated or working position, as shown in Figs. 1 and 2, the band-wheel thereof is supposed to be in line with the fly-wheel. In depressing the carrier, the motion of frame E is of course reversed so that the frame and head clear the fly-wheel. The head and frame are thus shifted automatically in raising and lowering the carrier, and the latter is operated by folding and unfolding the leaf B′. When the head is depressed, in accomplishing which the leaf B′ is folded back over all, as shown in Figs. 3 and 5, the leaf in that case covers the opening in top B, whereupon the leaf serves as the table-top during its folded position.

I is a flat spring secured to the inner front side of frame E, (see Figs. 2 and 4) this spring having attached a catch or dog *i*, the dog having preferably a conical free end. With frame E in its elevated position, the conical end of the dog engages a corresponding hole *b* in the table-top, and thereby locks the frame, holding the frame and load rigid in its elevated position. Meantime the carrier supports the frame and load, but the office of the dog is more especially to hold the free edge of the frame from vibrating, and this it effectually does. When, however, the carrier commences to descend, the weight of the frame and head would be sustained by the dog, were it able to do so, but the spring is not stiff enough for such purpose and the dog is forced back, after which the frame is free to descend with the carrier. As, therefore, the catching and releasing occurs automatically, the operator is released from all care in the matter, and when the machine is in working position it will be as stable as if it rested on the table-top. Were the locking of the frame done by hand, any inadvertence of the operator in the matter, would leave the head in such tremulous or shaking condition as would interfere with the perfect working of the machine and cause excessive wear at the joints, which difficulty is overcome by the automatic locking aforesaid.

$A^2$ designate doors for closing the forward side of the cabinet, said doors being hinged at $a^2$. The rear wall of the cabinet is provided with an opening $A^4$, for the purpose of ventilation in the operation of the sewing-machine, said opening being adapted to be closed by a door $A^3$ hinged, as at $a^3$, and a catch is provided at $a^4$ for locking the door in its closed position.

What I claim is—

1. In combination, a cabinet sewing-machine table or cabinet having a carrier movable up and down the cabinet, a horizontally-sliding-frame borne by the carrier and designed to bear the sewing-machine-head, a stationary inclined way or guide, and a member on the aforesaid sliding-frame adapted to engage said way or guide, the arrangement of parts being such that the aforesaid sliding-frame and load shall be moved horizontally during the up-and-down movement of the aforesaid carrier, substantially as and for the purpose set forth.

2. In combination, a cabinet sewing-machine table having a vertically-reciprocating-carrier, a horizontally-sliding-frame mounted on the carrier, such frame bearing the head, a stationary inclined way or guide, an attachment of the frame adapted to engage such way or guide, for shifting the frame and load horizontally by means of the vertical movement of the carrier, substantially as and for the purpose set forth.

3. In combination, a sewing-machine table or cabinet having a carrier, folding-leaf operatively connected with the carrier for raising and lowering the latter, a sliding-frame borne by and movable endwise of the aforesaid carrier, a stationary block provided with an inclined groove, and a member on the aforesaid sliding-frame and adapted to operate in said inclined groove, the arrangement of parts being substantially as set forth.

4. In combination, a sewing-machine-table having a carrier, and folding-leaf operatively connected with the carrier, for raising and lowering the latter, a frame mounted on and movable endwise of the carrier, a pendent stationary block attached to the table and having an inclined groove, a member of the frame adapted to operate in such inclined groove, the arrangement being substantially as described.

In testimony whereof I sign this specification, in the presence of two witnesses, this 9th day of June, A. D. 1894, at Cleveland, Ohio.

THEODOR KUNDTZ.

Witnesses:

C. H. DORER,

ELLA E. TILDEN.